Aug. 6, 1968     W. L. PAYNE     3,395,806

APPARATUS FOR EXTRACTING OIL FROM SOYBEANS

Filed April 8, 1965

INVENTOR
WILLIE L. PAYNE

BY Browne, Schuyler, & Beveridge

ATTORNEYS.

United States Patent Office 3,395,806
Patented Aug. 6, 1968

3,395,806
APPARATUS FOR EXTRACTING OIL
FROM SOYBEANS
Willie L. Payne, Salisbury, Md., assignor to A. W. Perdue & Son, Inc., Salisbury, Md., a corporation of Maryland
Filed Apr. 8, 1965, Ser. No. 446,598
4 Claims. (Cl. 210—345)

ABSTRACT OF THE DISCLOSURE

For use in extracting oil from soybeans, an extraction basket having a perforated bottom wall whose inner surface includes polytetrafluoroethylene for preventing soybeans from adhering thereto, during an extraction process.

---

This invention pertains to an improved apparatus for extracting oil from soybeans.

Commerical oil extraction processes in the treatment of soybeans usually employ a solvent to remove the oil from the soybeans. In one conventional extraction process, the soybeans, after preliminary treatment, are reduced to minute flakes and placed in a basket having a perforated bottom. A suitable solvent is then introduced into the basket to wash through the soybeans and extract the oil. Ultimately, the solvent drains through the perforated bottom of the basket to be re-introduced into the basket as many times as may be necessary.

It is well known that soybeans become tacky when moistened with water. This property of soybeans has long hindered the afore-mentioned extraction process because the moist soybeans adhere to the perforated basket bottom to materially restrict, if not prevent, drainage of the solvent from the basket. This is a most serious problem particularly since drainage of an adequate volume of the solvent from the basket is essential to efficient extraction of oil from the soybeans.

In one comercial method of removing obstructing soybeans from the basket bottom, the basket is struck against a bumper plate to dislodge the adhered soybeans. However, experience has proven that this method is satisfactory only when the obstructing soybeans are moist to a minor degree; it being understood that the adhering quality or tackiness of soybeans increases with moisture.

In many instances therefore, it has been necessary to interrupt the extraction process in order to scrape and remove the adhering soybeans from the bottom of the basket. The scraping operation not only involves added cost but further, stoppage of the extraction operation decreases production while presenting a plant hazard from the standpoint of fire as well as safety. Equally unfavorable, an appreciable solvent loss is often occasioned by shutdown of the extraction apparatus.

Accordingly, it is an object of the present invention to provide an improved apparatus for removing oil from soybeans with the use of extraction baskets but without incurring the above-stated problems.

A further object of the present invention is to provide such an apparatus which will extract oil from soybeans with relatively high efficiency.

A still further object of the present invention is the provision of a novel extraction basket having a perforated bottom which will not become clogged by moist soybeans despite continuous use over long periods.

Yet another object of the present invention is to provide such a novel extraction basket which may be made economically even from existing extraction baskets of the conventional type.

Figure 1:
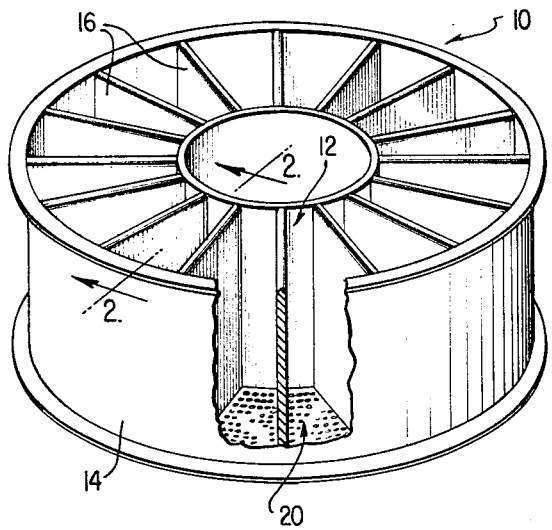
Figure 2:
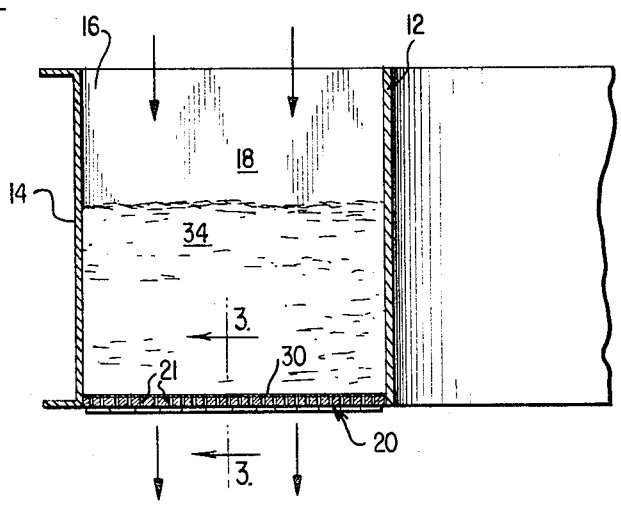
Figure 3:
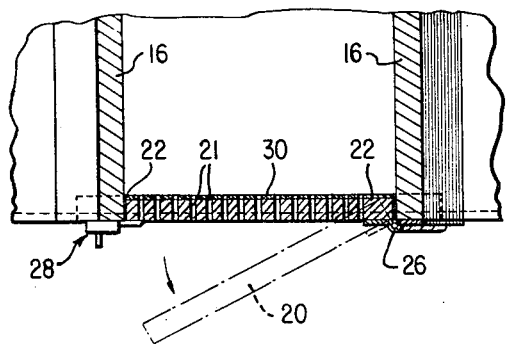

Other objects and advantages of the present invention will become apparent from the following description along with the attached drawings in which:

FIG. 1 is a perspective view of an extraction basket constructed in accordance with the present invention;
FIG. 2 is a fragmental cross-sectional view taken generally along lines 2—2 of FIG. 1; and
FIG. 3 is a fragmental cross-sectional view taken generally along lines 3—3 of FIG. 2.

Referring to the drawings in detail, there is shown for illustrative purposes only, an extraction basket, generally designated 10, embodying the present invention and being of the type presently employed commercially. In the illustrated embodiment, basket 10 includes an inner cylindrical wall or skirt 12 and an outer cylindrical wall or skirt 14 disposed concentrically in spaced relationship to inner wall 12. Extending radially between inner and outer walls 12 and 14 are a plurality of partitions 16 which divide the area between walls 12 and 14 into a plurality of compartments or cells 18 shown as sixteen in number. Cylindrical walls 12 and 14 and partitions 16 may be conventionally constructed such as from structural steel and so as to be non-corrosive and inert to soybeans or other material being processed as well as the particular solvent employed for extraction.

Extending across the bottom of each compartment 18 between adajacent partitions 16 and opposite segments of cylindrical walls 12 and 14 is a perforated trapezoidal member 20 which may be formed by a screen or by a steel grate of approximately 3/16" in thickness, the latter being illustrated with perforations designated 21. Except for their marginal frames 22, bottom members 20 are perforated substantially throughout their entire extent to provide adequate drainage of solvent during the extraction process which will be described subsequently. In one preferred form where bottom member 20 has an area of about 748 square inches, apertures 21 are 1/4" in diameter and spaced 3/8" from each other.

In order that the soybeans or other treated material may be removed from compartments 18 after the extraction process, bottom members 20 are mounted to be movable between open and closed positions with respect to the bottom of their associated compartments 18 as is conventional. In the specific embodiment shown in FIG. 3, this is accomplished by hinges 26 (one shown) connected to one side of frame 22 of each bottom member 20 and to the adjacent partition 16 so that bottom member 20 is pivotable between an open vertical position and a closed horizontal position. Any suitable latch such as that designated 28 is provided for releasably latching bottom member 20 in closed position; latch 28 being mounted on partition 16 to engage the free side of frame 22 as shown in FIG. 3.

In accordance with the present invention, the upper surfaces of bottom members 20 between perforations 21 are each covered with a layer of a substantially inert, that resistant, self-lubricating substance 30 preferably of polytetrafluoroethylene such as is manufactured under the trademark Teflon. In the preferred embodiment, the polytetrafluoroethylene 30 is coated in a thickness ranging from 0.3 to 2.0 mils to the top surface of bottom members 20 in any suitable manner or by any of the known comercial methods. However, as alternatives (not shown) bottom members 20 may be formed entirely from polytetrafluoroethylene or with the polytetrafluoroethylene applied as a preformed sheet of approximately 1/2" in thickness.

In practicing the method according to the present invention, basket 20 is placed in an extractor (not shown) which accommodates the particular basket; such an extractor being of the type presently used commercially.

The raw soybean flakes having been initially prepared in accordance with conventional practice, are finally reduced to thin flakes illustrated as 34 usually .010 to .014 inch in thickness, and then introduced into basket compartments 18. After compartments 18 are filled to a desired level with the soybean flakes, a suitable liquid solvent such as hexane is introduced into the top of compartments 18 at a temperature ranging from 120° F. to 160° F. as illustrated by the arrows in FIG. 2. The solvent percolates through soybean flakes 34 to extract oil therefrom and ultimately to drain through perforations 21 in bottom members 20. Percolation of the solvent is continued for a time, usually predetermined, sufficient for effective extraction of the oil and in this regard, solvent, draining from the basket 10, may be reintroduced into the top thereof during the extraction process. The amount of solvent employed per minute of percolation in a typical process may be computed by multiplying the weight in tons of the soybean flakes being processed by a factor of 0.275.

Because of the Teflon coating 30 on the upper surface of bottom members 20, the soybeans, although moist, will not adhere to bottom members 20 to clog apertures 21. The result is that drainage of the solvent is increased to and maintained at a constant rate which highly improves the efficiency of oil extraction. Moreover, the Teflon surface 30 eliminates the need for shutting down operation in order to remove obstructing soybeans from the bottom of the basket as has been heretofore necessary. While preventing soybeans from adhering to the bottom of the basket, the Teflon surface additionally offers high resistance to heat and is inert to a variety of substances which might be employed in the extraction process.

The above favorable results have been demonstrated in actual practice by a basket constructed in accordance with the present invention. This basket was employed in a typical extraction process and for a period of time that would have normally resulted in complete clogging of the drainage apertures in the bottom of the basket. The subject basket, however, with its Teflon bottom surface remained clear of obstructing soybeans and equally important, significantly increased the efficiency of oil extraction from the soybeans because of improved solvent drainage which it provided.

It will therefore be appreciated that not only are operating conditions improved by the present invention, but also the profitability of the plant is significantly improved due to effective oil extraction. Additionally, the present invention may be applied in conjunction with conventional extractors and processes with relatively low cost to provide the above advantages.

Although the present invention has been described with reference to soybeans and a particular extraction basket, it will be understood that the present invention may be employed to equal advantage with other extraction baskets and related extraction processes for other foods and substances similar to soybeans. Moreover, other modification and adaptations readily apparent from the foregoing description will lie within the spirit and scope of the invention as covered in the appended claims.

What is claimed is:

1. An extraction basket for use in extracting oil from soybeans or the like comprising; an inner wall and an outer wall enclosing the inner wall in spaced relationship thereto, a plurality of spaced partition members interconnecting said inner and outer walls and defining a number of segregated compartments adapted to receive soybeans, each compartment having a perforated bottom extending between said inner and outer walls and the partition members of the associated compartment, said perforated bottom having an inner surface of polytetrafluoroethylene for preventing soybeans from adhering thereto during processing.

2. The extraction basket defined in claim 1 wherein said inner and outer walls are cylindrical and said partition members extend radially between said inner and outer walls.

3. The extraction basket defined in claim 1 wherein there is provided hinge means mounting said perforated bottom for movement between a first position closing the lower end of the associated compartment for holding soybeans during an extraction operation and a second position opening the lower end of the associated compartment for subsequently discharging the soybeans.

4. A solvent extraction basket for use in extracting oil from soybeans or similar substances comprising an inner wall and an outer wall enclosing the inner wall in spaced relationship thereto, a plurality of spaced partition members interconnecting said inner and outer walls and defining a number of segregated compartments adapted to receive soybeans or the like, each compartment having a bottom grate extending between said inner and outer walls and the partition members of the associated comparmtent, said grate having on its upper surface a layer of polytetrafluoroethylene for preventing soybeans and the like from adhering thereto to thereby maintain a constant discharge rate of solvent through the grate during an extraction process.

References Cited

UNITED STATES PATENTS

| | | | |
|---|---|---|---|
| 2,116,044 | 5/1938 | Rucker | 210—482 |
| 2,317,449 | 4/1943 | Flock | 210—345 X |
| 3,080,063 | 3/1963 | Krynski et al. | 210—345 X |
| 3,250,398 | 5/1966 | Adiletta | 210—477 |
| 3,300,048 | 1/1967 | Pollock | 210—182 X |
| 3,321,080 | 5/1967 | Pansini et al. | 210—169 X |

REUBEN FRIEDMAN, *Primary Examiner.*

C. DITLOW, *Assistant Examiner.*